US005917503A

United States Patent [19]

[11] Patent Number: 5,917,503

Zakharia et al.

[45] Date of Patent: Jun. 29, 1999

[54] CONVERGING DATA PIPELINE DEVICE

[75] Inventors: Khaled Zakharia, Fort Collins; Darel N Emmot, Ft Collins, both of Colo.; Faisal Bhamani, Carrollton, Tex.

[73] Assignee: Hewlett Packard Company, Palo Alto, Calif.

[21] Appl. No.: 08/868,636

[22] Filed: Jun. 2, 1997

[51] Int. Cl.[6] .......... G06T 1/20

[52] U.S. Cl. .......... 345/506; 345/430; 345/513; 345/519

[58] Field of Search .......... 345/506, 512, 345/513, 501, 430, 519, 508, 515, 516, 418

[56] References Cited

U.S. PATENT DOCUMENTS

| | | | |
|---|---|---|---|
| 5,544,306 | 8/1996 | Deering et al. | 345/507 |
| 5,751,292 | 5/1998 | Emmot | 345/430 |

*Primary Examiner*—Kee M. Tung

[57] ABSTRACT

The present invention provides a converging data pipeline device comprising a first pipeline data path for carrying data, a second pipeline data path for carrying data, a shared pipeline data path which is capable of receiving data from each of the first and second pipeline data paths, and a resending mechanism comprised by the second pipeline data path. The resending mechanism makes a backup copy of at least a portion of the data at a particular location on the second path. Each of the paths comprises a plurality of pipeline stages, each pipeline stage capable of holding data and propagating the data in a direction from a first end of the path toward a second end of the path. The first end of the shared path is in communication with the second ends of the first and second data paths for receiving data from the second ends of the first and second data paths. When the flow of data is suspended along the second path, data is sent down the first path and through the shared path. This data will overwrite the data from the second path which was on the shared path when the flow of data on the second path was suspended. A backup copy of the overwritten data is stored in the resending mechanism. When the flow of data on the second path is resumed, the backup copy stored in the resending mechanism is sent through the second path and through the shared path so that the data which was overwritten is replaced. In accordance with the preferred embodiment of the present invention, the converging data pipeline device is implemented in a cache-based texel rasterizer of a computer graphics display system.

15 Claims, 5 Drawing Sheets

CONVERGING DATA PIPELINE DEVICE

TECHNICAL FIELD OF THE INVENTION

The present invention generally relates to a rasterizer for use in computer graphics display systems and, more particularly, to a rasterizer comprising a converging data pipeline device having a resending mechanism and a shared pipeline data path for reducing the amount of pipe stages needed in the rasterizer to accommodate two converging pipeline data paths.

BACKGROUND OF THE INVENTION

Computer graphics display systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen.

Generally, the primitives of the object to be rendered are defined by the host CPU in terms of primitive data. For example, when the primitive is a triangle, the host computer defines the primitive in terms of the X, Y and Z coordinates of each of its three vertices, the normals of each of the vertices, $N_x$, $N_y$ and $N_z$, and the red, green, blue and alpha (R, G, B and $\alpha$) color values of each vertex. Alpha is a transparency value. Rendering hardware interpolates all of this data to compute the display screen pixels that represent each primitive, and the R, G, B and $\alpha$ values for each pixel.

Additionally, the primitives may also be defined in terms of texture by using texture mapping when rendering images. Texture mapping allows different parts of an object being rendered to have different appearances, such as when it is necessary or desirable to render an object which is comprised of several composite features, such as a brick wall comprised of several bricks. Rather than drawing each brick individually, a wall can be drawn and then a brick wall texture can be mapped onto the wall.

Texture coordinates are normally referred to as s, t, r and q coordinates. In order to draw a texture-mapped scene, both the object coordinates and the texture coordinates for each vertex must be implemented. The object coordinates define the location of the vertex on the screen and the texture coordinates determine which texel in the texture map is to be assigned to that particular vertex.

A typical graphics machine includes a geometry accelerator, a rasterizer, a frame buffer controller and a frame buffer. Texture mapping is accomplished in the rasterizer, which performs pixel rasterization and texel rasterization to render a texture-mapped image on the display. The geometry accelerator receives three-dimensional vertex data from the host CPU in terms of red, green, blue and alpha (R, G, B and $\alpha$) data, X, Y, and Z data, $N_x$, $N_y$ and $N_z$ data, and s, t, r and q coordinate data for each primitive received by the geometry accelerator. The X, Y and Z coordinates define the locations of the vertices of the primitives on the display screen whereas the $N_x$, $N_y$ and $N_z$ data define the directions of the normals of the vertices of the primitives. The geometry accelerator processes all this data and outputs new R, G and B data and s, t, r and q data for each vertex to the rasterizer. When the image to be rendered is two-dimensional, the information defining the image can be sent directly to the rasterizer without first being sent to the geometry accelerator. Once the rasterizer receives the R, G, B data and the s, t, r and q data for the vertices, the rasterizer performs texture mapping and rasterizes the texture-mapped image.

Rasterizers capable of performing texture mapping generally comprise a texel rasterizing component and a pixel rasterizing component. These two components operate in parallel and are synchronized such that, as the pixel rasterizing component determines the location of a pixel on the screen, the texel rasterizing component determines the texture to be assigned to the particular pixel and outputs it to the pixel rasterizing component which maps it onto the particular pixel. For example, as the pixel rasterizing component determines the location of a pixel on the screen corresponding to a corner of a floor being rendered, the texel rasterizing component may determine the texture of a carpet to be mapped onto the pixel.

Within the texel rasterizing component, texture information and commands are received from the host CPU and processed to generate a texel which is output to the pixel rasterizing component. Generally, components referred to as an edge stepper and a span stepper within the texel rasterizer determine the s, t, r and q coordinates of each texel to be mapped and output this information to a rational linear interpolator, which applies a correction to the texel values to obtain a perspective view. This information is then output to a tiler which performs mathematical calculations on the texture information sent by the host CPU to the texel rasterizer to generate virtual addresses. These virtual addresses are then output to a directory which references them to memory to produce memory addresses corresponding to the locations in memory where the texture data corresponding to the texture to be mapped is stored. This information is then output to the pixel rasterizing component which maps the textures onto the pixels.

In order to maximize the speed of the rasterizing process, it is known to utilize cache-based rasterizers which store the texture information in cache memory to enable the rasterizer to quickly access the texture information. However, this requires checking the cache to determine whether the texture information sought is held in cache. When the texture information sought is not held in cache, the processing of the information by the components of the texel rasterizer, such as the tiler and the rational linear interpolator, must be halted long enough for the texture information sought to be downloaded by the host CPU into cache. The information being processed by the texel rasterizer travels along a "buffered path" while the information being downloaded into cache travels along an "unbuffered path". In order to prevent the information traveling along the unbuffered path from overwriting, and thus corrupting, the data traveling along the buffered path, separate paths have been used. By using separate paths, the information being sent along the buffered path is halted and the information being downloaded into cache by the CPU is simply sent down the unbuffered path and loaded into cache, without the possibility of overwriting the data traveling along the buffered path. Once the information has been loaded into cache, the shifting and processing of the data along the buffered path is resumed.

One disadvantage of providing completely separate paths for the buffered information and for the information being downloaded into cache is that each of these paths requires a large number of pipe stages for each path which, in turn, requires the allocation of a large amount of space for each path.

Accordingly, a need exists for a method and apparatus which maximizes the processing speed and efficiency of a cache-based texel rasterizer of a computer graphics display system while minimizing the amount of space required to be allocated for the buffered and unbuffered paths of the texel rasterizer component.

SUMMARY OF THE INVENTION

The present invention provides a converging data pipeline device comprising a first pipeline data path for carrying data, a second pipeline data path for carrying data, a shared pipeline data path which is capable of receiving data from each of the first and second paths, and a resending mechanism comprised by the second path. The resending mechanism makes a backup copy of at least a portion of the data passing through a particular location on the second path. Each of the paths comprises a plurality of pipeline stages, each pipeline stage capable of holding data and propagating the data in a direction from a first end of the path toward a second end of the path. The first end of the shared path is in communication with the second ends of the first and second data paths for receiving data from the second ends of the first and second data paths. When the flow of data is suspended along the second path, data is sent down the first path and through the shared path. This data will overwrite the data from the second pipeline data path which was on the shared path when the flow of data was suspended. A backup copy of the overwritten data is stored in the resending mechanism. When the flow of data on the second pipeline data path is resumed, the backup copy stored in the resending mechanism is sent through the second pipeline data path and through the shared pipeline data path so that the data which was overwritten is replaced.

In accordance with the preferred embodiment of the present invention, the converging data pipeline device is implemented in a cache-based texel rasterizer of a computer graphics display system. In this embodiment, the second pipeline data path corresponds to the buffered, or rendering, path within the texel rasterizer and the first pipeline data path corresponds to the unbuffered path within the texel rasterizer. Texture information is stored in a cache memory device of the texel rasterizer. The cache memory device is in communication with the second end of the shared pipeline data path for receiving data sent to cache via the shared pipeline data path. The first and second pipeline data paths are at least partially contained within a tiler component of the texel rasterizer and the shared path is contained partially within the tiler component and partially within a directory component of the texel rasterizer. As the texture coordinates flow along the second pipeline data path, the data resending mechanism, which is a resettable storage means, makes a backup copy of the texture coordinates before sending the texture coordinates to the shared pipeline data path.

The tiler component translates the texture coordinates into virtual address information and outputs the virtual address information to the directory component of the texel rasterizer via the shared path. The directory component then references the virtual address information to the cache memory device. The directory component determines whether a reference exists for the virtual address information. If the directory component determines that the reference does not exist, the processing and shifting of data along the second pipeline data path is suspended while the missing block of texture information is sent along the first pipeline data path to the shared pipeline data path and into the corresponding addresses in the cache memory device. When this occurs, the data which was contained on the shared pipeline data path which came from the second pipeline data path is overwritten. The resending mechanism makes a backup copy of the overwritten data as it passes through the second pipeline data path onto the shared pipeline data path. Once the texture information has been downloaded into the cache memory device, the resending mechanism sends at least a portion of the data stored therein to the shared path to replace the data which was overwritten. The data flow along the second pipeline data path is then resumed.

DETAILED DESCRIPTION OF THE INVENTION

Figure 1:
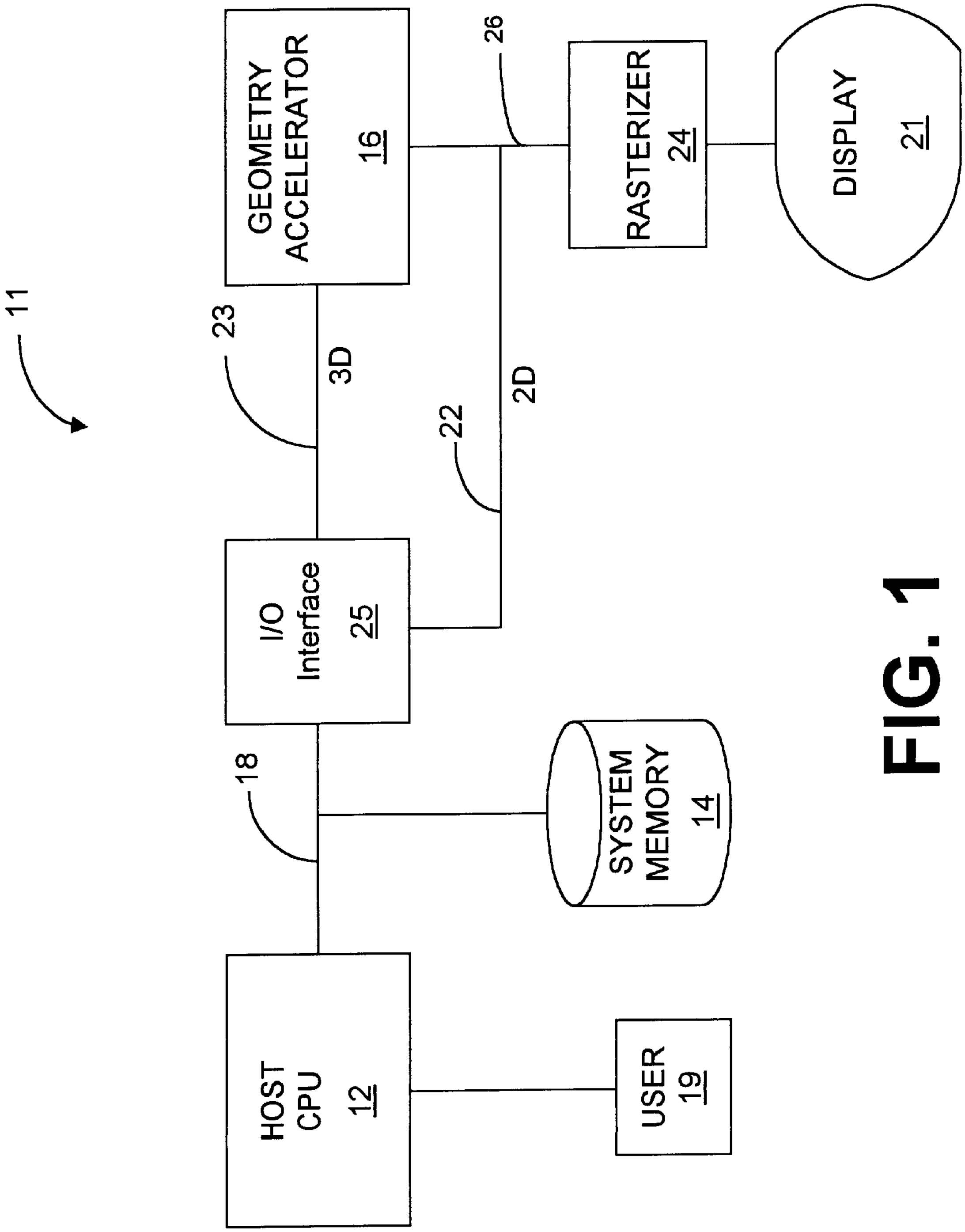
FIG. 1 (PRIOR ART)
FIG. 1 illustrates a functional block diagram of a well known computer graphics display system.

The basic components of a conventional computer graphics display system are shown in FIG. 1. The computer graphics display system 11 comprises a CPU 12, system memory 14, a display device 21, a geometry accelerator 16, a rasterizer 24 and an I/O interface 25, which connects the geometry accelerator 16 and rasterizer 24 with the host CPU 12. The CPU 12 communicates with the geometry accelerator 16, the rasterizer 24 and system memory 14 via I/O bus 18. The I/O interface 25 is connected to the rasterizer 24 and to geometry accelerator 16 via I/O lines 22 and 23, respectively. When the data output to the graphics hardware is 2-D data, it is sent directly to the rasterizer 24. When the data output to the graphics hardware is 3-D data, it is sent to the geometry accelerator 16 and then to the rasterizer 24. The data is sent from the geometry accelerator 16 to the rasterizer 24 via bus 26. A user 19 communicates with the CPU 12 via a peripheral device, such as a keyboard or mouse, to indirectly control the data being sent to the geometry accelerator 16, thereby controlling the rendering of the image being displayed on the display device 21.

Figure 2:
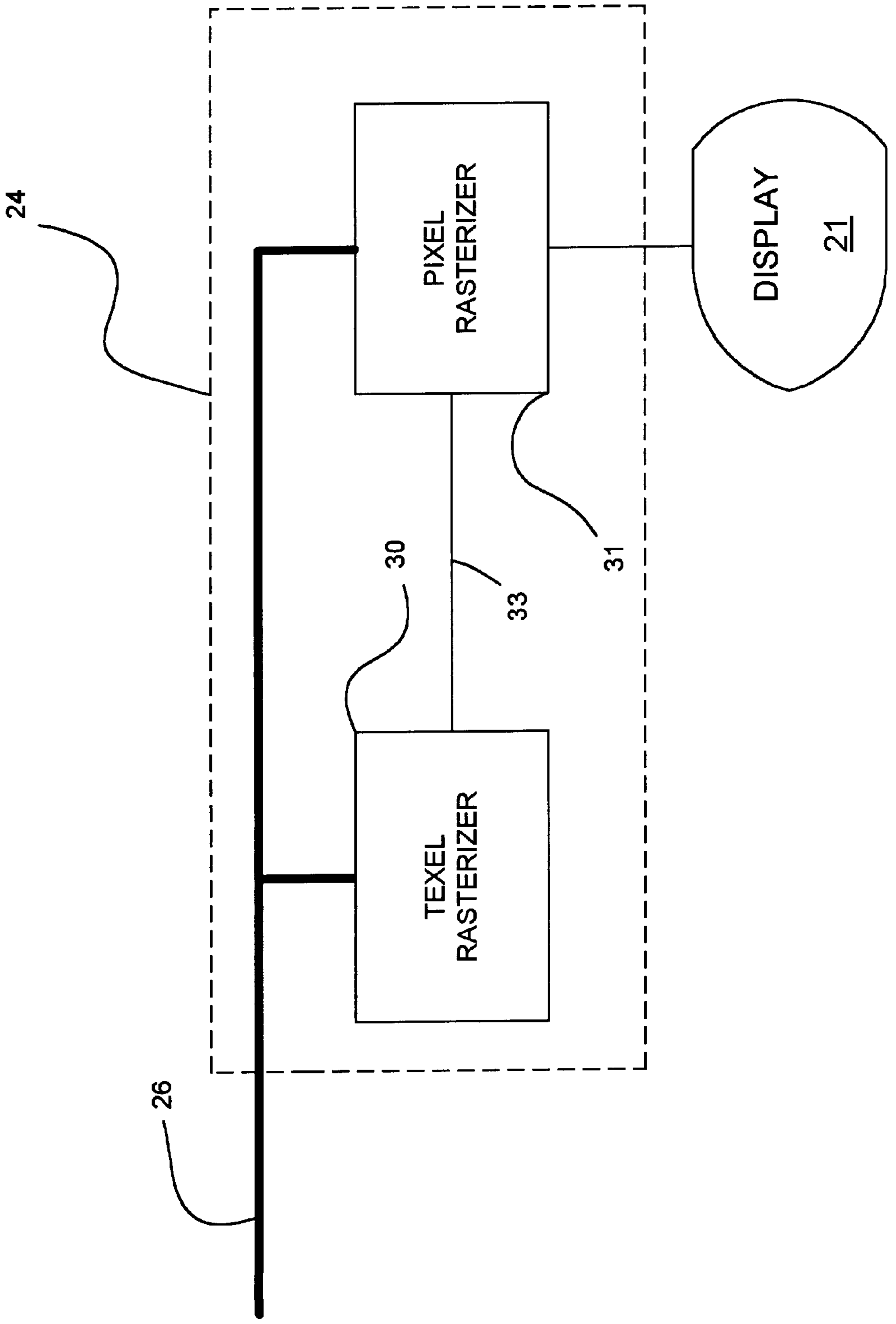
FIG. 2 illustrates a functional block diagram of a rasterizer of the computer graphics display system shown in FIG. 1.

FIG. 2 illustrates a block diagram of the rasterizer 24 shown in FIG. 1. Rasterizer 24 is comprised of a texel rasterizer 30 and a pixel rasterizer 31. The output of the texel rasterizer 30 is input to the pixel rasterizer 31 via line 33. The output of the pixel rasterizer is connected to display 21. When the information being sent to the rasterizer 24 is 2-D information, the information is sent via bus 26 to both the texel rasterizer 30 and to the pixel rasterizer 31. When the information being sent to the rasterizer 24 is 3-D information, the information is sent first to the geometry accelerator 16 and then from the geometry accelerator 16 via bus 26 to both the texel rasterizer 30 and to the pixel rasterizer 31. The operations of the pixel rasterizer 31 are well known in the art and, therefore, will not be discussed here in the interest of brevity.

The components of the texel rasterizer 30 of the present invention will now be discussed in detail with reference to FIG. 3. The texel rasterizer 30 preferably is implemented in an application specific integrated circuit (ASIC). The bus interface 38 receives commands and data being sent to the texel rasterizer 30 on bus 26 and stores the data and commands to be processed by texel rasterizer 30 in front end storage device 39. Front end storage device 39 is comprised of a buffered write first-in-first-out (FIFO) memory device (not shown), a buffered read FIFO memory device (not shown), an unbuffered write FIFO memory device (not shown) and an unbuffered read FIFO memory device (not shown). The buffered write and read FIFOs are comprised as part of the buffered path 50 of the texel rasterizer 30 and the unbuffered read and write FIFOs are comprised as part of the unbuffered path 52 of the texel rasterizer 30. The purposes of the buffered and unbuffered paths are discussed below in detail. The buffered and unbuffered write FIFOs store information written to the front end storage 39 by the bus interface 38. The buffered and unbuffered read FIFOs store information to be read by the bus interface 38 and processed by the bus interface 38 and output onto bus 26.

The front end storage device 39 receives information from the bus interface 38, decodes the information and decides where to send the information, i.e., it decides whether to send it to the buffered write FIFO or the unbuffered write FIFO. If the information is written to the buffered write FIFO, the front end storage device 39 outputs the information along the buffered path 50 to edge stepper 40. The edge stepper 40 performs rasterization to determine the s, t, r and q coordinates for each texel in the vertical direction of the primitive received by the edge stepper 40. The span stepper 41 performs rasterization to determine the s, t, r and q coordinates for each texel in the horizontal direction of the primitive. Once the s, t, r and q coordinates for each texel of the primitive have been determined, the rational linear interpolator 42 determines the perspective view for the primitive and applies a correction value to the coordinates. The corrected coordinates are then provided to the tiler 43 which performs a mathematical algorithm with the corrected coordinates to translate the coordinates into a virtual memory address.

The directory 44 receives the virtual memory address and references it to the cache memory 45 to determine whether the texture mapping information sought is located in cache memory 45. If a reference is not available, a "miss" has occurred and the directory 44 outputs an acknowledge signal 66 onto control line 53 which causes the flow and processing along the buffered path 50 to be suspended. At this point, whatever the last state was when the ackowledge signal occurred is held at each stage of the buffered path 50. After the acknowledge signal 66 occurs (see FIG. 5), a halt signal 65 is generated by the directory 44 and output onto control line 46, which switches the flow of data from the buffered path 50 to the unbuffered path 52 in the tiler 43. A validity signal 67 may also be generated by the tiler 43 and output to the directory 44 on control line 47. The purposes of the ackowledge signal, the halt signal and the validity signal are discussed in detail below with respect to FIG. 5.

When the acknowledge signal occurs, the directory 44 informs the texture mapping daemon (not shown) via an external interrupt line (not shown) that the texture mapping information sought is not in the cache memory device 45. As a result, the texture daemon downloads the missing block into cache 45 via the unbuffered path 52. The unbuffered texture objects are communicated to the texel rasterizer 30 via bus 26. The front end storage device 39 then causes the texture mapping information to be sent over bus 52 to tiler 43 and through directory 44, which in turn sends the information into cache memory device 45.

Bus 52 comprises the unbuffered path. The buffered path 50 cannot be used for downloading the texture mapping information into cache memory 45 because doing so would cause all of the information on the buffered path 50 to be overwritten. The buffered path 50 and the unbuffered path 52 both pass through the tiler 43 and converge into a shared path which passes through the tiler 43 and through the directory 44. The reason for the unbuffered path passing through the tiler 43 and the directory 44 is that the texture mapping information being downloaded to cache memory device 45 must be translated by the tiler 43 to obtain the virtual addresses and then the directory 44 must reference it to the cache memory device 45 where the texture mapping information being downloaded is to be stored.

In known cache memory-based rasterizers, there is no danger of the information on the buffered path being overwritten by the information sent along the unbuffered path because the two paths remain separate. The buffered path passes through the tiler and the directory whereas the unbuffered path bypasses the tiler and the directory and interfaces directly with the cache. The translation and referencing of the texture information sent down the unbuffered path to the cache is performed by software in the host CPU. It is desireable to remove this processing task from the host CPU to the texel rasterizer by providing two separate paths through the tiler and the directory to allow the information on the unbuffered path to be translated and referenced by the tiler and the directory, respectively. However, providing two separate paths through the tiler and the directory results in a trade off in terms of the amount of space utilized in the texel rasterizer 30 to accommodate the two paths. In order for the tiler 43 to perform translations of the s, t and r coordinates into virtual addresses, several pipe stages and logic circuits are implemented within the tiler 43. The various types of logic circuits (not shown) required are provided in between the pipe stages. In general, each path may require eight pipe stages, each stage being 300 bits wide on average. The number of bits increases as the data is shifted through the tiler 43 toward the directory due to the operations being performed on the data by the logic circuits. Therefore, the amount of space needed to be allocated for the separate paths is substantial.

In accordance with the present invention, it has been determined that a portion of the buffered path 50 passing through the tiler 43 can be replaced by a resending mechanism which makes a backup copy of a portion of the data passing through a particular location along the buffered path 50 and that the buffered and unbuffered paths can be merged to form a shared path. By using the resending mechanism of the present invention in conjunction with the shared path, a significant amount of space is saved within the texel rasterizer 30. The resending mechanism, which is a resettable storage means, is more space-efficient than equivalent number of bits of pipeline registers. No selection of data from different paths is necessary at processing elements along the shared path. Another advantage of using the resending mechanism and the shared path is that, if expansion occurs along the second or the shared path, the resending mechanism can be located at a point that minimizes the number of bits needed to recreate the second path portion that has been overwritten.

Figure 3:
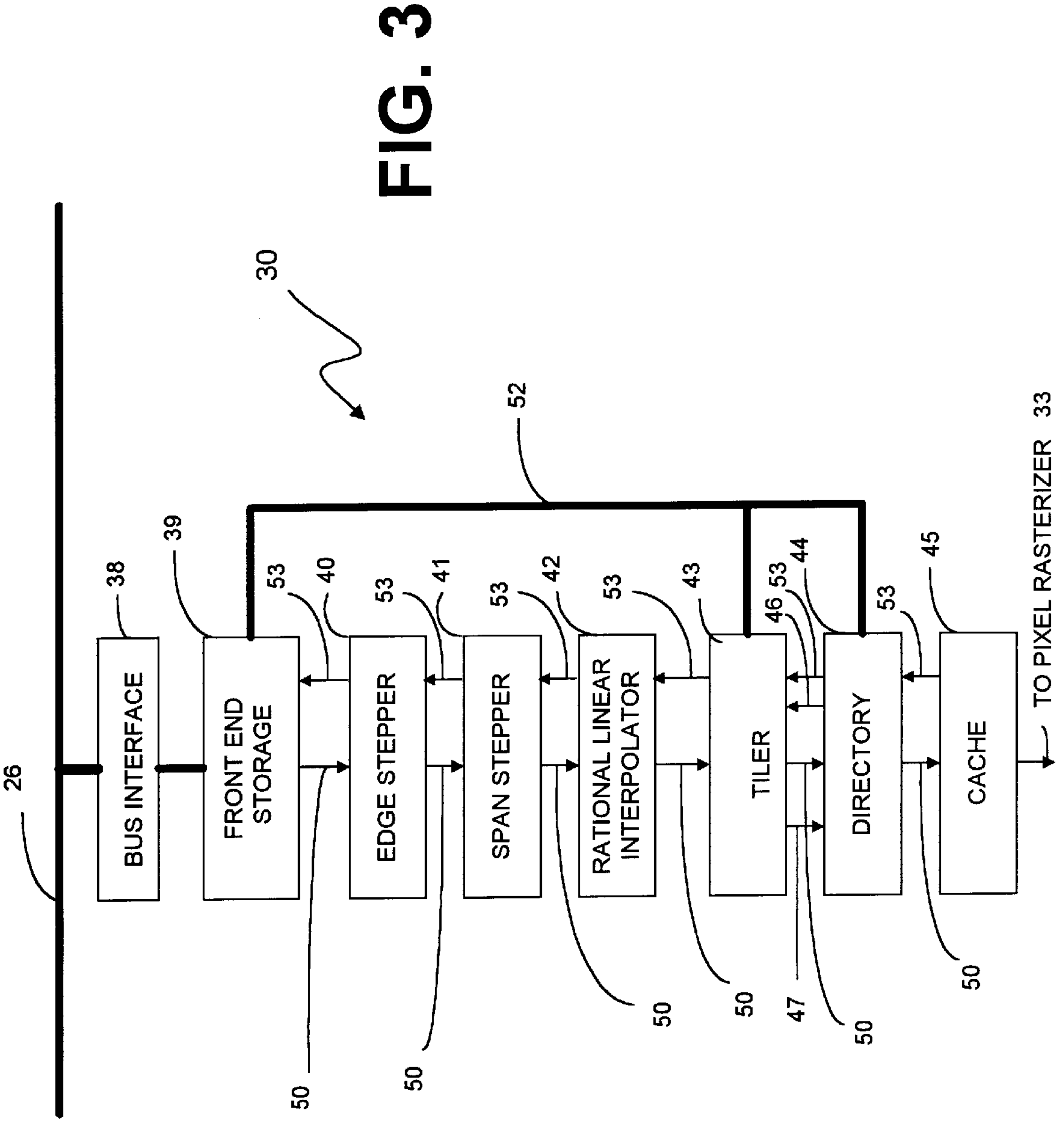
FIG. 3 illustrates a functional block diagram of a texel rasterizing component of the rasterizer shown in FIG. 2.
Figure 4:
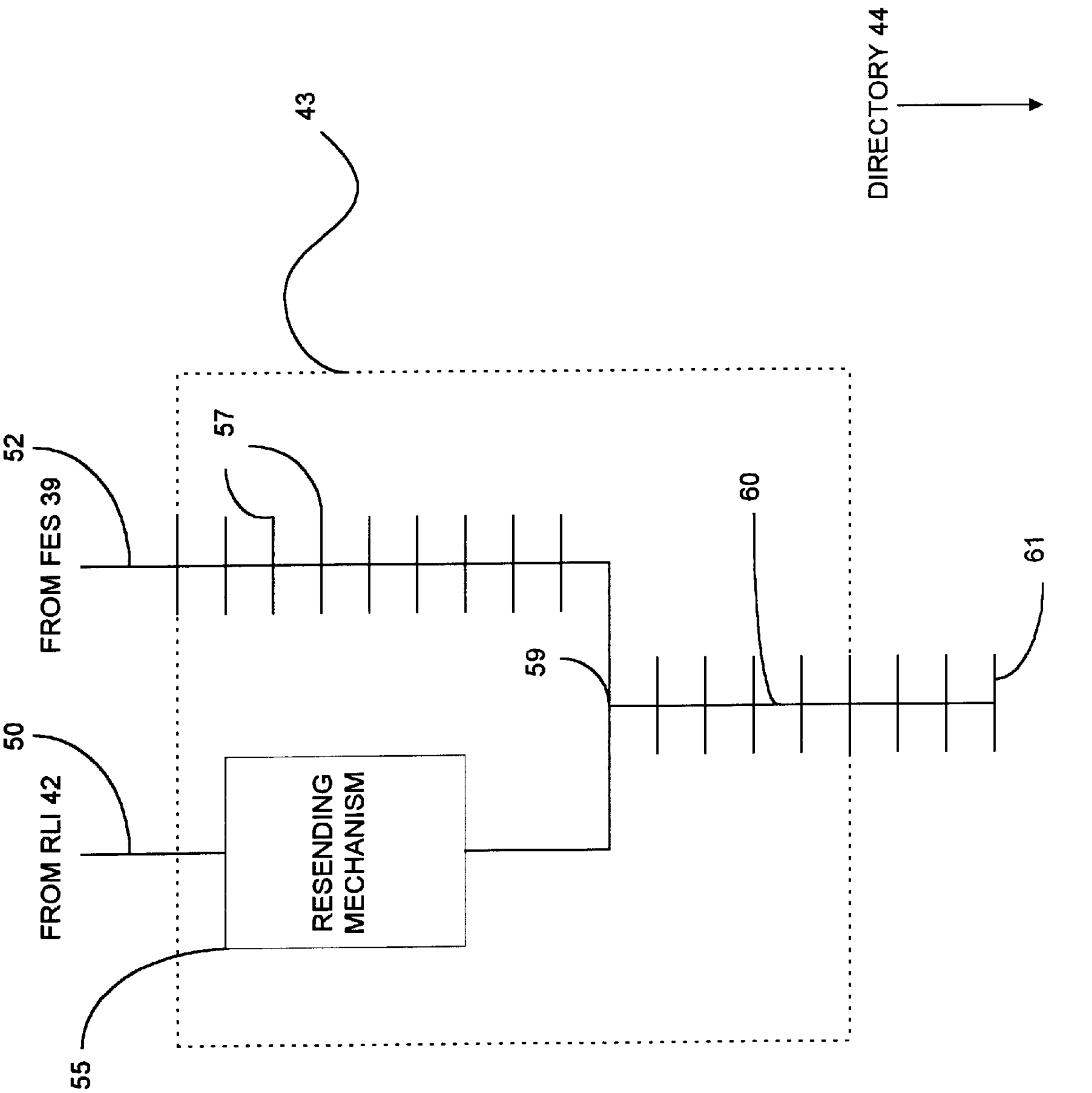
FIG. 4 illustrates a functional block diagram of the tiler of the texel rasterizing component shown in FIG. 3, wherein the tiler comprises the resending mechanism of the present invention.

FIG. 4 is a functional block diagram of the tiler 43 shown in FIG. 3. As illustrated, the tiler 43 contains a resending mechanism 55 located at the top of the tiler 43 which receives data being shifted along the buffered path 50 from the rational linear interpolator (RLI) 42. The resending mechanism 55 is a resettable storage means which preferably functions in a manner similar to a FIFO memory device. Preferably, the resettable storage means is ninety bits wide and twelve words deep. However, it will be apparent to those skilled in the art that the present invention is not limited with respect to the manner in which the resending mechanism 55 is physically implemented or with respect to the size of the resending mechanism 55. The arrow in FIG. 4 pointing down and away from the dashed box representing tiler 43 indicates that the directory 44 is below the tiler 43. It can be seen from FIG. 4 that the buffered path 50 and the unbuffered path 52 converge at point 59 within the tiler 43 to form a shared path 60. Each of the dashes 57 represents a pipe stage. For ease of illustration, the logic circuits at the inputs and outputs of the pipe stages 57 have not been shown.

The pipe stage 61 located within the directory 44 represents the location at which the directory 44 determines that a miss has occurred. It will be apparent to those skilled in the art that the present invention is not limited with respect to the location within the directory 44 at which a miss is detected or with respect to the location at which the paths converge to form the shared path. Once a miss has been detected, the directory 44 causes the buffered path to be halted and notifies the texture daemon (not shown) that the data being sought is not located in cache memory device 45. The daemon then causes the s, t and r coordinates corresponding to the missing texture mapping information to be sent down unbuffered path 52 to the tiler 43. The unbuffered data is then shifted through the pipe stages 57 and operated on by the logic circuits (not shown). When the halt signal 65 occurs, information from the buffered path will be contained on the shared path 60. This information will be overwritten and corrupted when the data on unbuffered path 52 is shifted along the shared path 60 through tiler 43 and directory 44. Therefore, once the unbuffered data has been shifted through directory 44 into cache memory 45, resending mechanism 55 will resend the buffered command data which was contained on the shared path 60 when the halt signal 65 occurred. Once the information which was missing from cache memory device 45 has been placed in cache memory device 45, the resent command data being shifted along the shared path 60 into the directory 44 will cause the corresponding texture mapping information to be output from cache memory device 45 and sent to the pixel rasterizer 33 (See FIG. 3).

Figure 5:
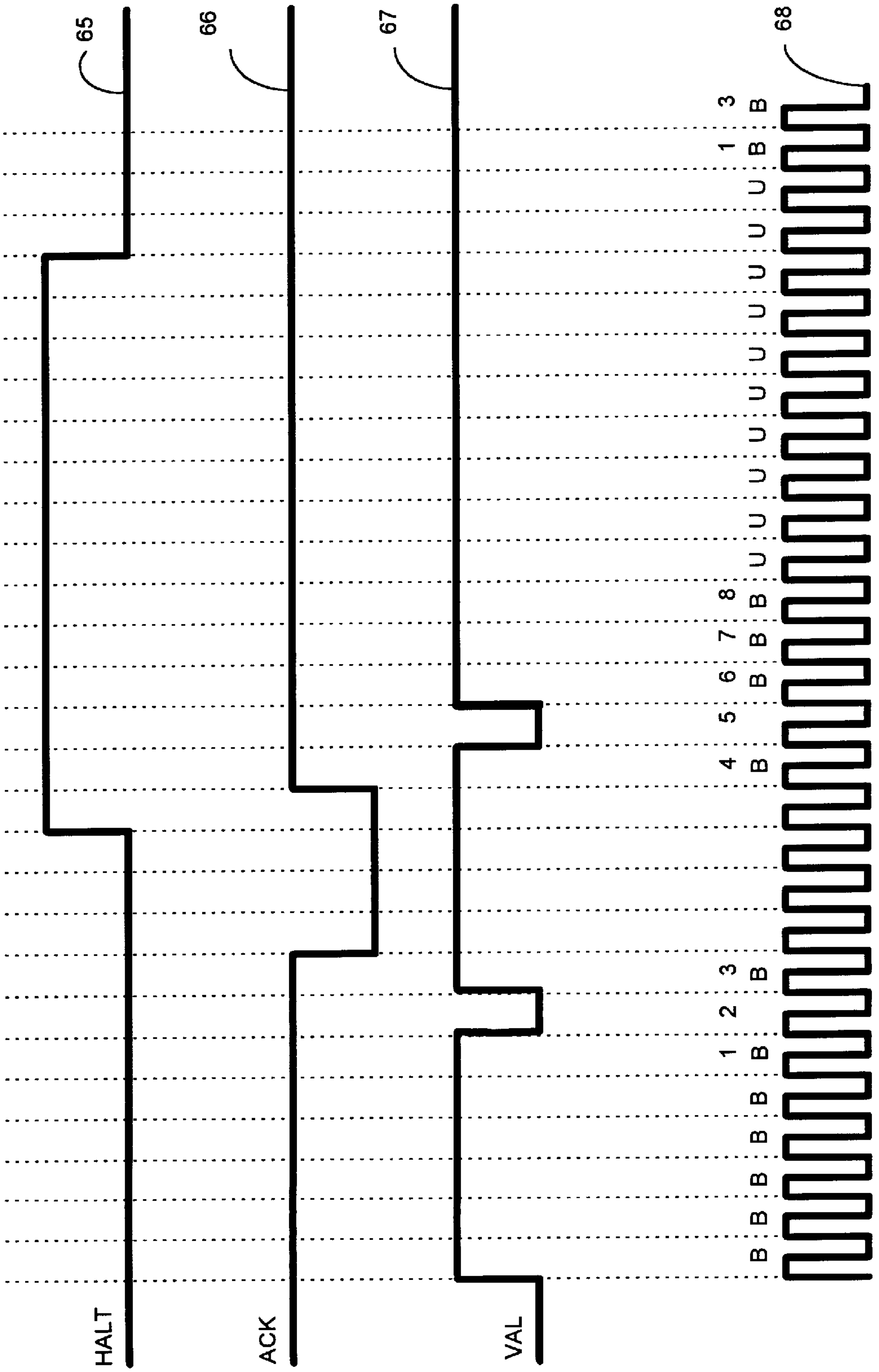
FIG. 5 illustrates timing diagrams functionally demonstrating the operation of the resending mechanism shown in FIG. 4.

FIG. 5 is a timing diagram illustrating the timing of the signals at the tiler 43/directory 44 interface which trigger a halt and which control the sending of the unbuffered data and the resending of the buffered data. As shown in FIG. 5, when a miss is detected, an acknowledge signal 66 sent from the directory to the tiler goes low causing the information along the buffered path to back up. This is followed by a halt signal 65 provided from the directory 44 to the tiler 43 which goes high. This switches the flow of data going through the tiler 43 and the directory 44 from the buffered path 50 to the unbuffered path 52. The acknowledge signal causes the components of the texel rasterizer 30 to suspend processing of information along the buffered path 50 and to hold the last state present at each stage along the buffered path 50 when the acknowledge signal 66 went low. When the halt signal 65 goes high, the acknowledge signal 66 will return to the high state. Now, however, the flow of data going into the directory 44 comes from the unbuffered path 52. The logical AND (not shown) of a validity signal 67 sent from the tiler 43 to the directory 44 and acknowledge signal 66 from the directory 44 to the tiler 43 is used as an indicator of how many buffered commands got flushed from the shared path 60 when the unbuffered commands were sent down the unbuffered path 52 onto the shared path 60 and through the directory 44. When the halt signal 65 returns to the low state, the flow of the data into the directory 44 switches back to the buffered path 50. This switching is accomplished by a multiplexer (not shown) located within tiler 43 which is responsive to the halt signal 65. The tiler 43 will then direct the resending mechanism 55 to resend all of the buffered commands which were on the shared path 60 when the halt signal was asserted.

In accordance with the preferred embodiment of the present invention, the shared path 60 comprises eight pipe stages, each of which can hold one buffered or unbuffered command. Of these eight, three are in the directory 44 and five are in the tiler 43. In accordance with this embodiment, the resending mechanism 55 makes a backup copy of the eight buffered commands which will be held on the shared path 60 when the halt signal 65 is asserted. Normally, all eight of these commands will be resent by the resending mechanism 55. However, when the validity signal 67 goes low or the acknowledge signal 66 goes low while a buffered command is on the shared path, the tiler 43 is informed that less than eight commands have been flushed and that the resending mechanism 55 will only resend the commands which were flushed. The number of states that the validity signal 67 is low or that the acknowledge signal 66 is low will determine how many and which commands will need to be resent. For example, when the validity signal 67 is deasserted for one clock pulse 68 after the buffered command which caused the miss has crossed the tiler 43/directory 44 interface, this indicates that only seven valid commands were flushed and that only those seven need to be resent. Similarly, if the validity signal 67 is deasserted for two clock pulses 68 after the buffered command which caused the miss has crossed the tiler 43/directory 44 interface, this is an indication that only six valid commands were flushed and that only those six will need to be resent. Therefore, the resending mechanism is a “smart” resending mechanism in that it only resends those commands that need to be resent.

The “Bs” above the clock pulses 68 in FIG. 5 correspond to buffered data at the tiler 43/directory interface 44 whereas the “Us” correspond to unbuffered data. The numerals above the “Bs” indicate the buffered command number along the shared path 60. Since the validity signal 67 was deasserted for two clock pulses after buffered command 1 crossed the tiler 43/directory 44 interface, this indicates that buffered commands 2 and 5 are not going to be resent. Therefore, after the unbuffered commands are sent, buffered commands 1, 3, 4, 6, 7 and 8 will be resent by resending mechanism 55. For ease of illustration, only resent buffered commands 1 and 3 are shown in FIG. 5.

It should be noted that the present invention is not limited with respect to the number of commands stored in the resending mechanism 55 and/or resent by the resending mechanism 55. It will be apparent to those skilled in the art that the resending mechanism 55 and the shared path 60 can be designed and implemented in a variety of different ways to achieve the goals of the present invention. It should also be noted that the present invention is not limited with respect to the location of the resending mechanism or with respect to the location of the shared path, provided they are located in such a manner as to be consistent with the goals of the present invention. It will be apparent to those skilled in the art that the present invention is not limited to the manner discussed above for switching the data flow from the buffered path to the unbuffered path, and vice versa, and for determining which data stored in the resending mechanism needs to be resent. Persons skilled in the art will realize that the manner discussed above is only one of many ways of performing these tasks. It will be apparent to those skilled in the art that other modifications may be made to the embodiments discussed above without deviating from the spirit and scope of the present invention.

What is claimed is:

1. A converging data pipeline device having a data resending mechanism and a shared path, the converging data pipeline device comprising:

a first pipeline data path having a first end and a second end and a plurality of pipeline stages, each pipeline stage capable of propagating data in a direction from the first end of the first path toward the second end of the first path;

a second pipeline data path having a first end and a second end and comprising a data resending mechanism which stores a backup copy of at least a portion of data being propagated along the second path;

a shared pipeline data path for carrying data, the shared path having a first end and a second end and comprising a plurality of pipeline stages, each pipeline stage of the shared path capable of propagating data in a direction from the first end of the shared path toward the second end of the shared path, the first end of the shared path being in communication with the second ends of the first and second paths for receiving data from the second ends of the first and second paths, the converging data pipeline device being capable of selecting between a first data flow from the path through the shared path or a second data flow from the second path through the shared path, wherein when the second data flow is selected, the resending mechanism sends at least a portion of the data stored as the backup copy through the shared path.

2. The converging data pipeline device claim 1, wherein the data resending mechanism is a resettable storage means having first-in-first-out functionality.

3. The converging data pipeline device of claim 1, wherein the converging pipeline data device is comprised in a texel rasterizer of a computer graphics display system, the first path corresponding to an unbuffered path within the texel rasterizer and the second path corresponding to a buffered path within the texel rasterizer.

4. The converging data pipeline device of claim 1, wherein the converging data pipeline device is comprised in a texel rasterizer of a computer graphics display system and wherein the first and second paths are at least partially contained within a tiler component of the texel rasterizer.

5. The converging data pipeline device of claim 1, wherein the converging data pipeline device is comprised in a texel rasterizer of a computer graphics display system, and wherein the shared path is located partially within a tiler component of the texel rasterizer of a computer graphics display system and partially within a directory component of the texel rasterizer of the computer graphics display system.

6. The converging data pipeline device of claim 1, wherein the converging data pipeline device is comprised in a texel rasterizer of a computer graphics display system, the texel rasterizer being comprised in an integrated circuit.

7. The converging data pipeline device of claim 1, the converging data pipeline device being comprised in a texel rasterizer of a computer graphics display system, wherein the first and second paths are partially contained within a tiler component of the texel rasterizer, the shared path being located partially within the tiler component and partially within a directory component of the texel rasterizer, wherein the backup copy stored in the resending mechanism corresponds to texture coordinates, wherein when the resending mechanism sends the texture coordinates stored as the backup copy through the second path to the shared path, the tiler component translates the texture coordinates into virtual addresses as the texture coordinates are propagated along the second path and outputs the virtual addresses through the shared path into the directory component which references the virtual addresses to a cache memory device comprised in the texel rasterizer, and wherein the directory component determines whether a block of texture information corresponding to the reference is contained in the cache memory device and asserts a control signal if the block of texture information corresponding to the reference is not in the cache memory device which causes propagation of data along the second path to be suspended, wherein when the propagation of data along the second path is suspended the first data flow is selected and a block of texture information corresponding to the block of texture information which was missing from the cache memory device is sent along the first path through the shared path and loaded into the cache memory device, wherein once the block of texture information has been loaded into the cache memory device, the second data flow is selected and the data resending mechanism sends at least a portion of the data stored therein to the shared path.

8. A method of merging data being propagated along two converging data pipeline paths onto a shared data pipeline path, the method comprising the steps of:

propagating data along a first pipeline data path in a direction from a first end of the first path toward a second end of the first data path;

propagating data along a second pipeline data path in a direction from a first end of the second path toward a second end of the second path, wherein the second path comprises a data resending mechanism;

storing a backup copy of at least a portion of the data being propagated along the second path in the data resending mechanism;

propagating data along a shared pipeline data path in a direction from a first end of the shared path toward a second end of the shared path, the first end of the shared path being in communication with the second ends of the first and second paths;

propagating data from the second end of the second path into the first end of the shared path and through the shared path to provide a first data flow;

suspending the first data flow;

once the first data flow has been suspended, propagating data from the second end of the first path into the first end of the shared path and through the shared path to provide a second data flow, wherein the data on the shared path associated with the second data flow overwrites and corrupts data on the shared path associated with the first data flow;

terminating the second data flow;

outputting at least a portion of the backup copy of the data stored in the resending mechanism onto the shared path to restore the data which was overwritten and corrupted; and resuming the first data flow.

9. The method of claim 8, wherein the data resending mechanism is a resettable storage means having first-in-first-out functionality.

10. The method of claim 8, wherein the first path corresponds to an unbuffered path within a texel rasterizer and wherein the second path corresponds to a buffered path within the texel rasterizer.

11. The method of claim 10, wherein the first and second paths are at least partially contained within a tiler component of the texel rasterizer.

12. The method of claim 11, wherein the shared path is located partially within the tiler component of the texel rasterizer and partially within a directory component of the texel rasterizer.

13. The method of claim 12, wherein the texel rasterizer is comprised as an integrated circuit, and wherein the first, second and shared paths and the resending mechanism are all located within the integrated circuit.

14. A method of processing data in a texel rasterizer comprising the steps of:

propagating data along a first pipeline data path, at least a portion of the first path being located within a tiler component of the texel rasterizer and within a directory component of the texel rasterizer, the tiler component translating texture information contained in the data being propagated along the first path into first virtual addresses and the directory component referencing the first virtual addresses to a cache memory device;

propagating data along a second pipeline data path, wherein the second path comprises a data resending mechanism, at least a portion of the second path being located within the tiler component and within a directory component, the tiler component translating texture information contained in the data being propagated along the second path into second virtual addresses and the directory component referencing the second virtual addresses to the cache memory device;

storing a backup copy of at least a portion of the data being propagated along the second path in the data resending mechanism;

propagating data along a shared pipeline data path, the shared path being located partially within the tiler component and partially within a directory component of the texel rasterizer;

propagating data from the second path into the shared path and through the shared path to provide a first data flow comprising the first virtual addresses;

suspending the first data flow when a determination is made that a block of texture information corresponding to the second virtual addresses is not contained in a cache memory device;

once the first data flow has been suspended, propagating data from the second end of the first path through the shared path to provide a second data flow comprising the first virtual addresses, wherein the first virtual addresses correspond to the block of texture information found not to be contained in the cache memory device;

terminating the second data flow once the block of texture information has been loaded into the cache memory device;

outputting at least a portion of the backup copy of the data stored in the resending mechanism onto the shared path; and resuming the first data flow.

15. The method of claim 14, wherein once the first data flow is resumed, the data sent from the resending mechanism onto the shared path references the cache memory device causing the block of texture information stored in the cache memory device to be output as texture mapping information and sent to a pixel rasterizer.

* * * * *

UNITED STATES PATENT AND TRADEMARK OFFICE

CERTIFICATE OF CORRECTION

PATENT NO. : 5,917,503
DATED : June 29, 1999
INVENTOR(S) : Khaled Zakharia et al.

It is certified that error appears in the above-identified patent and that said Letters Patent is hereby corrected as shown below:

Column 9,
Line 35, delete "the path" and insert therefor -- the first path --

Signed and Sealed this

Seventeenth Day of September, 2002

*Attest:*

JAMES E. ROGAN

*Attesting Officer*

*Director of the United States Patent and Trademark Office*